United States Patent [19]

Koshii et al.

[11] E Patent Number: Re. 32,958

[45] Reissued Date of Patent: Jun. 20, 1989

[54] THERMOSETTING EPOXY RESIN COMPOSITIONS

[75] Inventors: Taro Koshii, Chiba; Yoshitsugu Morita; Hideo Shinmi, both of Ichihara, all of, Japan; Tsuneo Hanada, Midland, Mich.

[73] Assignee: Toray Silicone Co., Ltd., Tokyo, Japan

[21] Appl. No.: 95,970

[22] Filed: Sep. 14, 1987

Related U.S. Patent Documents

Reissue of:

[64] Patent No.: 4,604,435
Issued: Aug. 5, 1986
Appl. No.: 672,052
Filed: Nov. 16, 1984

[30] Foreign Application Priority Data

Nov. 28, 1983 [JP] Japan ..... 58-223855

[51] Int. Cl.[4] ..... C08L 63/00; C08G 59/40; C09J 3/16; H01B 3/40

[52] U.S. Cl. ..... 525/476

[58] Field of Search ..... 525/476, 477

[56] References Cited

U.S. PATENT DOCUMENTS

| | | | |
|---|---|---|---|
| 3,294,718 | 12/1966 | Antonen | 528/19 |
| 4,082,719 | 4/1978 | Liles et al. | 525/476 |
| 4,157,357 | 6/1979 | Mine et al. | 525/476 |
| 4,283,513 | 8/1981 | Mikami | 525/477 |
| 4,287,326 | 9/1981 | Mikami | 525/523 |
| 4,291,144 | 9/1981 | Takago | 525/476 |
| 4,376,174 | 3/1983 | Itoh et al. | 523/456 |
| 4,385,158 | 5/1983 | Mikami et al. | 525/477 |

*Primary Examiner*—Herbert J. Lilling
*Attorney, Agent, or Firm*—Marc C. Pawl

[57] ABSTRACT

What is disclosed are thermosetting epoxy resin compositions containing block siloxane copolymers which are used to induce low internal stress in the cured compositions and to provide coefficients of thermal expansion more closely aligned with the coefficients of thermal expansion of the substrates being molded therewith.

7 Claims, No Drawings

THERMOSETTING EPOXY RESIN COMPOSITIONS

Matter enclosed in heavy brackets [ ] appears in the original patent but forms no part of this reissue specification; matter printed in italics indicates the additions made by reissue.

BACKGROUND OF THE INVENTION

The present invention deals with thermosetting epoxy resin compositions. In particular, this invention deals with thermosetting epoxy resin compositions which give cured products with an extremely low internal stress and low coefficient of thermal expansion.

Cured epoxy resin compositions have been used widely as insulating materials in various types of electrical and electronic parts using methods such as transfer molding, injection molding, potting, casting, powder coating, dip coating and dripping because their electrical properties such as their dielectric character, volume resistivity and dielectric breakdown strength; their physical properties such as flexural strength, compression strength and impact strength, are excellent. However, epoxy resins are generally rigid resins and the mechanical stress imparted to the internal elements in electrical/electronic parts is quite significant. Thus, when electrical/electronic parts are encapsulated with an epoxy resin, the parts may not function normally or part of the element may be damaged. One cause of these phenomena seems to be the difference in the coefficients of thermal expansion between the element of an electrical/electronic part and the epoxy resin. The coefficients of thermal expansion of elements in electrical/electronic parts are very low while that of an epoxy resin is relatively high. Such large differences in the coefficient of thermal expansion result in the transmission of an excessive internal stress to the elements of electrical/electronic parts and other constituent materials after the part is encapsulated and cured. In addition, such differences in the coefficient of thermal expansion produce cracks in the epoxy resin itself and also cause a gap between the electrical/electronic part and the epoxy resin. The element deteriorates when water enters this gap.

Attempts have been made to overcome these disadvantages and at least two are known techniques. One is to add a resin to the epoxy resin which can impart flexibility. Although such a flexibility imparting agent prevents crack formation in the epoxy resin, it lowers the hardness, one of the most important characteristics of an epoxy resin. When heated, it also lowers the glass-transition temperature of the epoxy resin. This results in a loss of the high-temperature properties of the epoxy resin. The second technique is the addition of an inorganic filler with a lower coefficient of thermal expansion such as silica or alumina in an amount larger than usual. A cured product with the desired coefficient of thermal expansion can be obtained by this method. However, the flowability of the epoxy resin composition is substantially reduced which causes operations such as casting, transfer molding, potting, powder coating and dripping, to be essentially impossible. Since the Young's modulus of the epoxy resin is increased, the effect of lowering the internal stress by lowering the coefficient of thermal expansion may be reduced.

While considering the drawbacks of the prior-art technology, the present inventors carried out extensive investigations in an attempt to develop a thermosetting epoxy resin composition with a low coefficient of thermal expansion and low internal stress which does not cause blocking in powder coatings, and in which the physical properties of the cured product and the process flowability are not degraded and with which mold staining and bleeding onto the surface of the part of element does not occur during the molding process. As a result, the inventors found that the addition of a high-molecular weight, resin-linear organopolysiloxane block copolymer is very effective in lowering the coefficient of thermal expansion and lowering the stress, in thermosetting epoxy resin compositions.

THE INVENTION

The present invention therefore deals with thermosetting epoxy resin compositions which are comprised of the following components:

(a) 100 parts by weight of epoxy resin;

(b) 1 to 100 parts by weight of a curing agent for the epoxy resin composition;

(c) 1 to 100 parts by weight of an organopolysiloxane composition which is a block copolymer containing at least one linear polysiloxane block and at least one resinous polysiloxane block wherein there is present in the block copolymer (i) 10 to 90 weight percent of linear organopolysiloxane blocks having the unit formula $\text{+}R_2SiO\text{+}_n$ and (ii) 90 to 10 weight percent of resinous organopolysiloxane blocks, the weight percents being based on the total weight of (i) and (ii) in the block copolymer, wherein R is independently selected from substituted and unsubstituted monovalent hydrocarbon groups having from 1 to 8 carbon atoms; n is an integer with a value of about 10 to [100] *1000*; the solvent solution viscosity of the block copolymer being at least 30 centipoise at 25° C. for a 40 weight percent solution: the parts of (b) and (c) being based on 100 parts of (a).

The epoxy resin component (a) contains at least two epoxy groups per molecule. Any epoxy resin known in the prior art can be used. Examples are diglycidyl ethers of bisphenol A, their polymers known as epi-bis epoxy resins, bisphenol F epoxy resins, resorcinol epoxy resins, tetrahydroxyphenylethane epoxy resins, cresol novolak epoxy resins, polyolefin epoxy resins, alicyclic epoxy resins and their halides, to name a few. A single type of epoxy resin or a mixture of two or more resins can be used as component (a).

Component (b) is a curing agent for component (a). Compounds known in the prior art can be used. Examples are acid anhydride curing agents such as phthalic anhydride, pyromellitic anhydride, tetrahydrophthalic anhydride, hexahydrophthalic anhydride, succinic anhydride, benzophenonetetracarboxy anhydride; amine curing agents such as dicyanodiamide, diaminodiphenylmethane, diaminodiphenyl sulfone, metaphenylenediamine, bis(3-methyl-4-aminophenyl)methane and bis(4-aminocyclohexyl)methane; phenol novolak curing agents; silanol-containing, low molecular-weight silicon compounds and aluminum containing curing agents can also be used. The quantity of curing agent varies with the type of curing agent used and the curing agent is added at 1 to 100 weight parts per 100 weight parts of component (a). From the standpoint of achieving optimum properties, the curing agent is preferably added at 1 to about 80 weight parts. In addition to the curing agent, a curing accelerator or catalyst in the form of an imidazole or tertiary amine can be used.

Component (c), the novelty of this invention, acts to lower the coefficient of thermal expansion of the thermosetting epoxy resin composition and to reduce internal stress. R in the linear organopolysiloxane expressed by the general formula $\text{-}R_2SiO\text{-}_n$ is independently selected from substituted and unsubstituted monovalent hydrocarbon radicals containing 1 to 8 carbon atoms and examples thereof are alkyl groups such as methyl, ethyl, propyl and butyl; cycloalkyl groups such as cyclohexyl; alkenyl groups such as vinyl and allyl; aryl groups such as phenyl and xylyl; aralkyl groups such as phenylethyl; halogenated monovalent [nydrocarbon] *hydrocarbon* groups such as γ-chloropropyl and 3,3,3-trifluoropropyl and monovalent hydrocarbon radicals which contain hydroxyl, carboxyl, carboxylic acid ester or mercapto groups. R is generally methyl or a combination of methyl and one other species of monovalent hydrocarbon groups. At least one such linear organopolysiloxane block must be present in component (c) and a multiple number of linear organopolysiloxane blocks is generally present.

Examples of the linear organopolysiloxane blocks in component (c) are dimethylpolysiloxane blocks, methylphenylpolysiloxane blocks, methyloctylpolysiloxane blocks, methylcyclohexylpolysiloxane blocks, methyl(α-phenylethyl)polysiloxane blocks, methyl(3,3,3-trifluoropropyl)polysiloxane blocks, dimethylsiloxanediphenylsiloxane copolymer blocks, methylvinylpolysiloxane blocks and dimethylsiloxane-methylvinylsiloxane copolymer blocks.

The degree of polymerization of the linear organopolysiloxane block is 10 or more. When the degree of polymerization is less than 10, the coefficient of thermal expansion of the thermosetting epoxy resin composition and its internal stress are not significantly reduced. From this standpoint, the degree of polymerization is preferably 20 or more. When the degree of polymerization is too high, the dispersibility into component (a) becomes poor. Therefore, the degree of polymerization is preferably 1000 or less and in particular 500 or less.

The reason why the present linear organopolysiloxane block must be present in component (c) at 10 to 90 weight % is as follows. When this proportion is less than 10 weight %, the coefficient of thermal expansion of the thermosetting epoxy resin composition and its internal stress are not significantly reduced. When it exceeds 90 weight %, mold staining and bleeding onto the surface of the cured product may appear.

Other than the linear organopolysiloxane block, the resinous siloxane blocks which make up component (c) are constituted mainly of $R^1SiO_{3/2}$ and $R^2{}_2SiO$ units. The diorganosiloxane unit $R^2{}_2SiO$ denotes random bonding with a degree of polymerization of less than 10. $R^1$ and $R^2$ are the same as for R above. Generally, methyl, phenyl and vinyl are most frequently used. Component (c) preferably contains Si-bonded hydroxyl or alkoxy groups.

A condition of component (c) is that the solution viscosity at 25° C. for a toluene solution with a 40 weight % solids content must be at least 30 cP. When this value is less than 30 cP, mold staining, burring and leaching onto the surface of the cured product may occur. The solution viscosity at 40 weight % solids is preferably 40 cP or higher.

The quantity of component (c) in the composition is 1 to 100 weight parts per 100 parts of component (a) and preferably 5 to 50 weight parts. When the quantity of component (c) is too low, the effects of the addition of component (c) do not appear. When this value exceeds 100 weight parts, the properties of the original thermosetting epoxy resin will tend to be degraded.

The various additives commonly used in thermosetting epoxy resin compositions can be added to the thermosetting epoxy resin composition of the present invention. Examples of these additives are inorganic fillers such as fumed silica, fused silica, crystalline silica, alumina, alumina hydrate, talc, diatomaceous earth, mica, asbestos, calcium carbonate, glass beads and glass fiber; flame retardants such as antimony oxide, halides and phosphorus compounds; internal mold-release agents such as the metal salts of higher fatty acids and ester waxes, silane coupling agents; colorants and dyes.

The thermosetting epoxy resin composition of the present invention is readily produced by blending the preceding components (a), (b) and (c) to homogeneity using a mixing device such as a two-roll, extruder, kneader mixer, Henschel mixer, or the like.

The thermosetting epoxy resin compositions of this invention will flow at room temperature or elevated temperatures. When the compositions are maintained at elevated temperatures for a certain period, the thermosetting epoxy resin composition will cure to produce cured products with an extremely low internal stress. Since the characteristics of the original epoxy resin are not degraded, the cured products are very useful as sealants, fills, coating, adhesives and powder coatings for various machine and tool parts, various electrical parts such as resistors and transformer coils and electronic parts such as transistors, IC's, diodes, thermistors, and the like.

The present invention will be explained below with reference to the following examples and comparison examples. Parts in the examples and comparison examples denote weight parts. The various properties were determined by the following specifications and methods.

Model staining: Molding was repeated 20 times in the same mold which was then visually inspected for stains on the mold surface.

($T_g$) Glass-transistion point: determined according to JIS K-6911.

(a-1) Coefficient of thermal expansion: determined according to JIS K-6911.

Flexural strength: determined according to ASTM D-790.

(E) Flexural elastic modulus: determined according to ASTM D-790.

EXAMPLE 1

A mixture consisting of 100 parts cresol novolak epoxy resin with a softening point of 80° C. and an epoxy equivalent weight of 220, 50 parts phenol novolak resin with a softening point of 80° C., 350 parts fused silica powder 2 parts carbon black, 2 parts carnauba wax and 1 part 2-methylimidazole was combined with 30 parts of a linear dimethylpolysiloxane block-containing methylphenylpolysiloxane resin (A) which consists of 5 mol % $CH_3SiO_{1.5}$ units, 50 mol % $C_6H_5SiO_{1.5}$ units and 5 mol % $C_6H_5(CH_3)SiO$ units (random polymerization) and 40 mol % $(CH_3)_2SiO$ units (present as $\text{-}(CH_3)_2SiO\text{-}_{50}$) and which has a 41 cP viscosity at 25° C. (toluene solution containing 40 weight % solids). This mixture was blended on a hot roll at 80° to 90° C. and the product was cooled and pulverized and used as a thermosetting epoxy resin composition.

This composition was then molded at 175° C. for 4 hours, the glass-transition temperature ($T_g$), coefficient of thermal expansion ($\alpha_1$), flexural strength and flexural elastic modulus (E) were measured. The results are presented in Table 1 along with the component proportions for methylphenylpolysiloxane resin (A). Mold staining was scored by observing the extent of staining on the metal surface after repeating the preceding transfer molding twenty times using the same mold and is reported subjectively.

COMPARISON EXAMPLE 1

A methylphenylpolysiloxane resin was prepared which lacked linear organopolysiloxane blocks and which consisted of 45 mol % $CH_3SiO_{1.5}$ units, 40 mol % $C_6H_5SiO_{1.5}$ units and 15 mol % $C_6H_5(CH_3)SiO$ units (random polymerization) and which had a 51 cP viscosity at 25° C. (toluene solution containing 40 weight % solids). 30 parts of this resin were added instead of the methylphenylpolysiloxane resin (A) of Example 1 to prepare a composition in a manner otherwise identical to Example 1. The physical properties were determined after transfer molding and the obtained results are presented in Table 1.

COMPARISON EXAMPLE 2 A

[methylphenylphoysiloxane] *methylphenylpolysiloxane* resin was prepared which lacked linear organopolysiloxane blocks and which consisted of 40 mol % $CH_3SiO_{1.5}$ units, 45 mol % $C_6H_5SiO_{1.5}$ units and 15 mol % $C_6H_5(CH_3)SiO$ units (random polymerization) and which a 15 cP viscosity at 25° C. (toluene solution containing 40 weight % solids). 30 parts of this resin were added instead of the methylphenylpolysiloxane resin (A) of Example 1 to prepare a composition in a manner otherwise [identical to] *the same as in* Example 1. The physical properties were determined after transfer molding and the results are presented in Table 1.

COMPARISON EXAMPLE 3

A linear dimethylpolysiloxane block-containing methylphenylpolysiloxane resin was prepared which consisted of 5 mol % $CH_3SiO_{1.5}$ units, 50 mol % $C_6H_5SiO_{1.5}$ units and 5% mol % $C_6H_5(CH_3)SiO$ units (random polymerization) and 40 mol % $(CH_3)_2SiO$ units (present as $\text{+}(CH_3)_2SiO\text{+}_{50}$) and with a 13 cP viscosity at 25° C. (toluene solution containing 40 weight % solids). 30 parts of this resin were added instead of the methylphenylpolysiloxane resin (A) used in Example 1 to prepare a composition in otherwise the same manner as in Example 1. The physical properties were determined after transfer molding and the results are presented in Table 1.

COMPARISON EXAMPLE 4

30 parts of a cresol novolak epoxy resin with a softening point of 80° C. and an epoxy equivalent weight of 220 were used in place of the same amount of linear dimethylpolysiloxane block-containing methylphenylpolysiloxane resin (A) comprising component (c) in Example 1 to prepare a composition under otherwise the same conditions as in Example 1. Their physical properties were determined after transfer molding and the results are presented in Table 1.

TABLE 1

| Composition ratios (mol %) | Example 1 | Comparison Examples 1 | 2 | 3 | 4 |
|---|---|---|---|---|---|
| $CH_3SiO_{1.5}$ | 5 | 45 | 40 | 5 | — |
| $C_6H_5SiO_{1.5}$ | 50 | 40 | 45 | 50 | — |
| $C_6H_5(CH_3)SiO$ | 5 | 15 | 15 | 5 | — |
| $(CH_3)_2SiO$ | 40 | — | — | 40 | — |
| Solution viscosity (cP) | 41 | 51 | 15 | 13 | — |
| Physical properties | | | | | |
| $T_g$ (°C.) | 181 | 172 | 178 | 170 | 175 |
| alpha$_1$ (/°C.) × $10^5$ | 1.8 | 2.4 | 2.4 | 1.9 | 3.0 |
| flexural strength (kg/cm$^2$) | 950 | 90 | 1055 | 1010 | 1090 |
| E (kg/mm$^2$) | 1080 | 1210 | 1250 | 1260 | 1100 |
| Stress criterion | | | | | |
| E · alpha$_1$ ($T_g$ − 25) (kg/mm$^2$) | 3.0 | 4.3 | 4.6 | 35. | 5.0 |
| mold staining | no | no | yes | yes | no |

EXAMPLE 2

A linear dimethyl polysiloxane block-containing methylphenylpolysiloxane resin (B) was prepared which consisted of 50 mol % [$CH_{6H5}SiO_{1.5}$] $C_6H_5SiO_{1.5}$ units and 5 mol % $C_6H_5(CH_3)SiO$ units (random polymerization) and 45 mol % [$(CH_3)_2SiO$] $(CH_3)_2SiO$ units (present as $\text{+}(CH_3)_2SiO\text{+}_{50}$) and [with] *which had* a 53 cP viscosity at 25° C. (toluene solution containing 40 weight % solids). 30 parts of this methylphenylpolysiloxane resin (B) were used instead of the same amount of methylphenylpolysiloxane resin (A) in Example 1 to prepare a composition under conditions which were otherwise the same as in Example 1. The physical properties were determined after transfer molding and the results are presented in Table 2.

EXAMPLE 3

A linear dimethylpolysiloxane block-containing methylphenylpolysiloxane resin (C) was prepared which consisted of 5 mol % $CH_3SiO_{1.5}$ units, 45 mol % $C_6H_5SiO_{1.5}$ units and 50 mol % $(CH_3)_2SiO$ units (present as $\text{+}(CH_3)_2SiO\text{+}_{50}$) and which had a 67 cP viscosity at 25° C. (toluene solution containing 40 weight % solids). 30 parts of this methylphenylpolysiloxane resin (C) were used instead of the same amount of methylphenylpolysiloxane resin (A) in Example 1 to prepare a composition under conditions which were otherwise the same as in Example 1. The physical properties were determined after transfer molding and the results are presented in Table 2.

COMPARISON EXAMPLE 5

A linear dimethylpolysiloxane block-containing methylpolysiloxane resin was prepared which consisted of 40 mol % $CH_3SiO_{1.5}$ units and 5 mol % $C_6H_5(CH_3)SiO$ units (random polymerization) and 55 mol % $(CH_3)_2SiO$ units (present as $\text{+}(CH_3)_2SiO\text{+}_{50}$) and with a 9 cP viscosity at 25° C. (toluene solution containing 40 weight % solids). 30 parts of this resin were added instead of the same amount of methylphenylpolysiloxane resin (A) used in Example 1 to prepare a composition under conditions which were otherwise the same as in Example 1. The physical properties were determined after transfer molding and the results are presented in Table 2.

COMPARISON EXAMPLE 6

A methylphenylpolysiloxane resin lacking linear organopolysiloxane blocks was prepared which consisted of 50 mol % $CH_3SiO_{1.5}$ units, 25 mol % $C_6H_5SiO_{1.5}$ units and 15 mol % $C_6H_5(CH_3)SiO$ units (random polymerization and with a 58 cP viscosity at 25° C. (toluene solution containing 40 wt % solids). 30 parts of this resin were used instead of the same amount of methylphenylpolysiloxane resin (A) used in Example 1 to prepare a composition in a manner otherwise the same as in Example 1. The physical properties were determined after transfer molding and the results are presented in Table 2.

COMPARISON EXAMPLE 7

A linear dimethylpolysiloxane block-containing methylphenylpolysiloxane resin was prepared which consisted of 5 mol % $CH_3SiO_{1.5}$ units, 45 mol % $CH_6H_5SiO_{1.5}$ units and 50 mol % $[CH_3(_2SiO]$ $(CH_3)_2SiO$ units present as $\text{-}(CH_3)_2SiO\text{-}_{50}$) and with a 12 cP viscosity at 25° C. (toluene solution containing 40 weight % solids). A composition was prepared using 30 parts of this resin instead of the same amount of methylphenylpolysiloxane resin (A) used in Example 1 in a manner otherwise the same as in Example 1. The physical properties were determined after transfer molding and the results are presented in Table 2.

TABLE 2

| Composition ratios (mol %) | Examples 2 | Examples 3 | Comparison Examples 5 | Comparison Examples 6 | Comparison Examples 7 |
|---|---|---|---|---|---|
| $CH_3SiO_{1.5}$ | — | 5 | 40 | 50 | 5 |
| $C_6H_5SiO_{1.5}$ | 50 | 45 | — | 35 | 45 |
| $C_6H_5(CH_3)SiO$ | 5 | — | 5 | 15 | — |
| $(CH_3)_2SiO$ | 45 | 50 | 55 | — | 50 |
| Solution viscosity (cP) | 53 | 67 | 9 | 58 | 12 |
| Physical properties | | | | | |
| $T_g$ (°C.) | 179 | 175 | 177 | 179 | 174 |
| alpha$_1$ (/°C.) × $10^5$ | 1.8 | 1.8 | 1.8 | 2.4 | 1.8 |
| flexural strength (kg/cm$^2$) | 1010 | 900 | 990 | 1020 | 1080 |
| E (kg/mm$^2$) | 1050 | 950 | 1260 | 1210 | 1150 |
| Stress criterion | | | | | |
| E · alpha$_1$ $T_g$ − 25) (kg/mm$^2$) | 2.9 | 2.6 | 3.3 | 4.5 | 3.1 |
| mold staining | no | no | yes | no | yes |

EXAMPLE 4

37.5 parts cresol novolak epoxy resin with a softening point of 80° C. and an epoxy equivalent weight of 220, 37.5 parts bisphenol A epoxy resin with a softening point of 80° C. and an epoxy equivalent weight of 500, 37.5 parts methylphenylpolysiloxane resin (A) of Example 1, 37.5 parts tetrahydrophthalic anhydride, 420 parts crystalline silica powder, 2 parts carbon black, 2 parts carnauba wax and 1 part 2-methylimidazole were blended on a hot roll at 80° to 90° C. and the product is cooled and pulverized and used as a thermosetting epoxy resin composition. The physical properties were determined after molding as in Example 1 and the results are presented in Table 3.

COMPARISON EXAMPLE 8

37.5 parts of the methylphenylpolysiloxane resin lacking linear organopolysiloxane blocks of Comparison Example 6 were used instead of the same amount of methylphenylpolysiloxane resin (A) used in Example 4 to prepare a composition as in Example 4. The physical properties were determined after molding and the results are presented in Table 3.

COMPARISON EXAMPLE 9

An additional 37.5 parts cresol novolak epoxy resin with a softening point of 80° C. and an epoxy equivalent weight of 500 were used in place of the same amount of methylphenylpolysiloxane resin (A) in Example 4 to prepare a composition under conditions otherwise identical to those in Example 4. The physical properties were determined after molding and the results are presented in Table 3.

TABLE 3

| Physical properties | Examples 4 | Comparison Examples 8 | Comparison Examples 9 |
|---|---|---|---|
| $T_g$ (°C.) | 174 | 177 | 173 |
| alpha$_1$ (/°C.) × $10^5$ | 2.1 | 2.8 | 2.6 |
| flexural strength (kg/cm$^2$) | 1145 | 1200 | 1360 |
| E (kg/mm$^2$) | 1480 | 1510 | 1690 |
| Stress criterion | | | |
| E · alpha$_1$ ($T_g$ − 25) (kg/mm$^2$) | 4.6 | 6.4 | 6.5 |
| mold staining | no | no | no |

EXAMPLE 5 TO 7

A linear dimethylpolysiloxane block-containing methylphenylpolysiloxane resin (D) was prepared which consisted of 10 mol % $CH_3SiO_{1.5}$ units, 50 mol % $C_6H_5SiO_{1.5}$ units and 5 mol % $CH_2{=}CH(CH_3)SiO$ units (random polymerization) and 35 mol % $(CH_3)_2SiO$ units (present as $\text{-}(CH_3)_2SiO\text{-}_{180}$) and with a 74 cP viscosity at 25° C. (toluene solution containing 40 weight % solids). This methylphenylpolysiloxane resin (D) was added at 20 parts (Example 5), 40 parts (Example 6) or 60 parts (Example 6) in place of the methylphenylpolysiloxane resin (A) used in Example 1 and molded and the physical properties were measured. The results are presented in Table 4.

TABLE 4

| Physical properties | Examples 5 | Examples 6 | Examples 7 |
|---|---|---|---|
| $T_g$ (°C.) | 172 | 170 | 175 |
| alpha$_1$ (/°C.) × $10^5$ | 1.9 | 1.8 | 1.7 |
| flexural strength (kg/cm$^2$) | 930 | 850 | 680 |
| E (kg/mm$^2$) | 1080 | 910 | 850 |
| Stress criterion | | | |
| E · alpha$_1$ ($T_g$ − 25) (kg/mm$^2$) | 3.0 | 2.4 | 2.2 |
| mold staining | no | no | no |

As shown in Tables 1 to 4, the thermosetting epoxy resin compositions of the present invention are compositions which give very low coefficients of thermal expansion and low internal stress without mold staining.

That which is claimed is:

1. A thermosetting epoxy resin composition comprising a mixture of (a) 100 parts by weight of epoxy resin;

(b) 1 to 100 parts by weight of a curing agent for the epoxy resin composition;

(c) 1 to 100 parts by weight of an organopolysiloxane composition which is a block copolymer containing at least one linear polysiloxane block and at least one resinous polysiloxane block wherein there is present in the block copolymer (i) 10 to 90 weight percent of linear organopolysiloxane blocks having the unit formula $\text{-}R_2SiO\text{-}_n$ and (ii) 90 to 10 weight percent of resinous organopolysiloxane blocks, the weight percents being based on the total weight of (i) and (ii) in the block copolymer, wherein R is independently selected from substituted and unsubstituted monovalent hydrocarbon groups having from 1 to 8 carbon atoms; n is an integer with a value of about 10 to [100] *1000*; the solvent solution viscosity of the block copolymer being at least 30 centipoise at 25° C. for a 40 weight percent solution[:]; the parts of (b) and (c) being based on 100 parts of (a).

2. A composition as claimed in claim 1 wherein there is present (a) 100 parts by weight of the epoxy resin (b) 1–80 parts by weight of the curing agent and (c) 5–50 parts by weight of the organopolysiloxane copolymer.

3. A composition as claimed in claim 2 wherein there is present (a) 100 parts by weight of the epoxy resin;

(b) 30 parts by weight of the curing agent, and (c) 30 parts by weight of the organopolysiloxane copolymer.

4. A composition as claimed in claim 2 wherein there is present (a) 100 parts by weight of cresol novolak epoxy resin;

(b) 1–80 parts by weight of tetrahydrophthalic anhydride, and (c) 5–50 parts by weight of a block copolymer consisting of 70 weight percent resinous block and 30 weight percent linear block.

5. A composition as claimed in claim 2 wherein there is present (a) 100 parts by weight of cresol novolak epoxy resin;

(b) 1–80 parts by weight of phthalic anhydride, and (c) 5–50 parts by weight of a block copolymer consisting of 70 weight percent resinous block and 30 weight percent linear block.

6. A composition as claimed in claim 2 wherein there is present (a) 100 parts by weight of cresol novolak epoxy resin;

(b) 1–80 parts by weight of phenol novolak resin, and (c) 5–50 parts by weight of a block copolymer consisting of 70 weight percent resinous block and 30 weight percent linear block.

*7. A thermosetting epoxy resin composition comprising a mixture of*

*(a) 100 parts by weight of epoxy resin;*

*(b) 1 to 100 parts by weight of a curing agent for the epoxy resin composition;*

*(c) 1 to 100 parts by weight of an organopolysiloxane composition which is a block copolymer containing at least one linear polysiloxane block and at least one resinous polysiloxane block wherein there is present in the block copolymer (i) 10 to 90 weight percent of linear organopolysiloxane blocks having the unit formula $(R_2SiO)_n$ and (ii) 90 to 10 weight percent of resinous organopolysiloxane blocks, the weight percents being based on the total weight of (i) and (ii) in the copolymer, wherein R is independently selected from substituted and unsubstituted monovalent hydrocarbon groups having from 1 to 8 carbon atoms; n is an integer with a value of about 10 to 500; the solvent solution viscosity of the block copolymer being at least 30 centipoise at 25° C. for a 40 weight percent solution; the parts of (b) and (c)* being based on 100 parts of *(a).*

* * * * *